(12) United States Patent
Nishimoto et al.

(10) Patent No.: US 8,384,822 B2
(45) Date of Patent: Feb. 26, 2013

(54) DIGITAL CAMERA AND INTERCHANGEABLE LENS

(75) Inventors: Hitoshi Nishimoto, Yokohama (JP);
Yoshiaki Tanabe, Yokohama (JP);
Tomoyuki Takada, Yokohama (JP);
Makoto Kohinata, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/067,388

(22) Filed: May 27, 2011

(65) Prior Publication Data

US 2011/0234888 A1      Sep. 29, 2011

Related U.S. Application Data

(63) Continuation of application No. 12/068,236, filed on Feb. 4, 2008, now abandoned.

(30) Foreign Application Priority Data

Feb. 5, 2007  (JP) ................. 2007-025614
Feb. 6, 2007  (JP) ................. 2007-026805

(51) Int. Cl.
*H04N 5/225* (2006.01)
(52) U.S. Cl. ...................... 348/360; 348/373
(58) Field of Classification Search .......... 348/360, 348/373
See application file for complete search history.

(56) References Cited

U.S. PATENT DOCUMENTS

| | | | |
|---|---|---|---|
| 5,748,994 A * | 5/1998 | Kai et al. ............ | 396/55 |
| 7,057,642 B2 | 6/2006 | Mogamiya et al. | |
| 7,222,388 B2 | 5/2007 | Sugihara | |
| 2001/0055072 A1 | 12/2001 | Mogamiya et al. | |
| 2007/0201865 A1 | 8/2007 | Sugihara | |

FOREIGN PATENT DOCUMENTS

| | | |
|---|---|---|
| JP | 9-15670 | 1/1997 |
| JP | 9-138458 | 5/1997 |
| JP | 11-295797 | 10/1999 |
| JP | 11-305331 | 11/1999 |
| JP | 2001-358974 | 12/2001 |
| JP | 2002-300442 | 10/2002 |
| JP | 2003-57530 | 2/2003 |
| JP | 2003-319219 | 11/2003 |
| JP | 2004-326095 | 11/2004 |
| JP | 2005-062552 | 3/2005 |
| JP | 2005-295152 | 10/2005 |
| JP | 2006-010725 | 1/2006 |
| JP | 2006-47662 | 2/2006 |
| JP | 2006-100875 | 4/2006 |
| JP | 2007-017700 | 1/2007 |

OTHER PUBLICATIONS

Japanese Office Action for corresponding Japanese Application 2007-025614; dated Jul. 19, 2011.
U.S. Office Action for Parent U.S. Appl. No. 12/068,236; mailed May 27, 2010.
U.S. Office Action for Parent U.S. Appl. No. 12/068,236; mailed Nov. 30, 2010.

* cited by examiner

*Primary Examiner* — James Hannett
(74) *Attorney, Agent, or Firm* — Staas & Halsey LLP

(57) ABSTRACT

A digital camera includes: a mirror box that defines a space in which a light flux from a photographic lens is guided to an imaging unit; a mirror unit that is arranged inside the mirror box and is configured to rotate between a viewing position in which the mirror unit is inserted in a photographic light path from the photographic lens to the imaging unit to reflect the light flux and a photographing position in which the mirror unit is retracted from the photographic light path; and an opening section that discharges from the mirror box air that is moved when the mirror unit is rotated.

20 Claims, 15 Drawing Sheets

DIGITAL CAMERA AND INTERCHANGEABLE LENS

CROSS-REFERENCE TO RELATED APPLICATIONS

This application is a continuation application of U.S. patent application Ser. No. 12/068,236, filed Feb. 4, 2008 now abandoned, the disclosure of which is herein incorporated in its entirety by reference. The disclosure of the following priority applications are herein incorporated by reference:

Japanese Patent Application No. 2007-025614 (filed Feb. 5, 2007); and

Japanese Patent Application No. 2007-026805 (filed Feb. 6, 2007).

Also, the disclosure of the following application is herein incorporated by reference:

Japanese Patent Application No. 2001-102253 (filed Mar. 30, 2001).

BACKGROUND

1. Field

The present invention relates to a digital camera and to an interchangeable lens.

2. Description of the Related Art

Japanese Laid-open Patent Publication No. 2002-300442 discloses a camera in which an illumination means such as an LED provided below a mirror box illuminates an imaging unit through an opening provided on the lower surface of the mirror box to detect dust (foreign matter) adherent to an optical filter.

The construction described in the above-mentioned publication is simply contemplated to detect the dust adherent to the imaging unit but can not remove the adherent dust.

SUMMARY

A digital camera according to a 1st aspect of the present invention includes: a mirror box that defines a space in which a light flux from a photographic lens is guided to an imaging unit; a mirror unit that is arranged inside the mirror box and is configured to rotate between a viewing position in which the mirror unit is inserted in a photographic light path from the photographic lens to the imaging unit to reflect the light flux and a photographing position in which the mirror unit is retracted from the photographic light path; and an opening section that discharges from the mirror box air that is moved when the mirror unit is rotated.

According to a 2nd aspect of the present invention, in the digital camera according to the 1st aspect, it is preferable that the opening section is provided in the mirror box closer to the photographic lens than a point of intersection between the mirror unit in the viewing position and an optical axis of the photographic lens.

According to a 3rd aspect of the present invention, in the digital camera according to the 1st aspect, at least a part of the opening section may be provided in the mirror box in an area closer to the photographic lens than an edge, on a side to the photographic lens, of the mirror unit in the viewing position.

According to a 4th aspect of the present invention, in the digital camera according to the 1st aspect, a flash-sensor unit arranged in a vicinity of the mirror box may be further included, wherein the opening section may be provided in an area of the mirror box closer to the photographic lens than the flash-sensor unit.

According to a 5th aspect of the present invention, in the digital camera according to the 1st aspect, the opening section may be provided in an area of the mirror box in a direction in which the mirror unit moves from the photographing position to the viewing position.

According to a 6th aspect of the present invention, in the digital camera according to the 5th aspect of the present invention, it is preferable that the opening section is provided in an area close to an optical axis of the photographic lens.

According to a 7th aspect of the present invention, in the digital camera according to the 1st aspect, the opening section may be provided only in a part of the mirror box closer to the photographic lens than an edge, on a side to the photographic lens, of the mirror unit in the viewing position.

According to a 8th aspect of the present invention, in the digital camera according to the 1st aspect, the opening section may be provided in a plane of the mirror box, which plane intersects neither an optical axis of the photographic lens nor an axis of rotation of the mirror unit.

According to a 9th aspect of the present invention, in the digital camera according to the 1st aspect, the opening section may be provided in a plane of the mirror box, which plane is near the mirror unit in the photographing position.

According to a 10th aspect of the present invention, in the digital camera according to the 1st aspect, the opening section may be provided in a plane of the mirror box, which is on a side of the mirror box opposite to a plane near the mirror unit in the photographing position.

According to a 11th aspect of the present invention, in the digital camera according to the 1st aspect, the opening section may be provided in a plane of the mirror box, which plane intersects an axis of rotation of the mirror unit.

According to a 12th aspect of the present invention, in the digital camera according to the 1st aspect, a shutter arranged between the mirror unit and the imaging unit may be further provided, and the mirror unit may be rotated when the shutter is in a closed state.

According to a 13th aspect of the present invention, in the digital camera according to the 1st aspect, a shutter arranged between the mirror unit and the imaging unit may be further provided, and the mirror unit may be rotated from the photographing position to the viewing position when the shutter is in an opened state.

According to a 14th aspect of the present invention, in the digital camera according to the 1st aspect, a shutter arranged between the mirror unit and the imaging unit may be further provided, the mirror unit may be rotated from the photographing position to the viewing position when the shutter is in an opened state, and the mirror unit may be rotated from the viewing position to the photographing position when the shutter is in a closed state.

An interchangeable lens for a camera according to a 15th aspect of the present invention includes an opening section adapted to discharge air that is moved when a mirror unit arranged in the camera is rotated.

A digital camera according to a 16th aspect of the present invention includes the interchangeable lens for a camera according to the 15th aspect.

According to a 17th aspect of the present invention, in the digital camera according to the 1st aspect, it is preferable that a lid member that is adapted to open and close the opening section.

According to a 18th aspect of the present invention, in the digital camera according to the 17th aspect, the photographic lens may be detachably attached to a camera body of the digital camera, and the lid member may be adapted to be in an open state when the photographic lens is attached to the camera body of the digital camera and to be in a closed state when the photographic lens is detached from the camera body of the digital camera.

According to a 19th aspect of the present invention, in the digital camera according to the 17th aspect, the lid member may be adapted to be in an open state when the mirror unit is being rotated and to be in a closed state when the mirror unit is not being rotated.

According to a 20th aspect of the present invention, in the digital camera according to the 17th aspect, the lid member may be adapted to be in an open state when power of the digital camera is ON and to be in a closed state when the power of the digital camera is OFF.

DETAILED DESCRIPTION

Referring to FIGS. 1 to 7, one embodiment of the present invention is explained.

Figure 1:
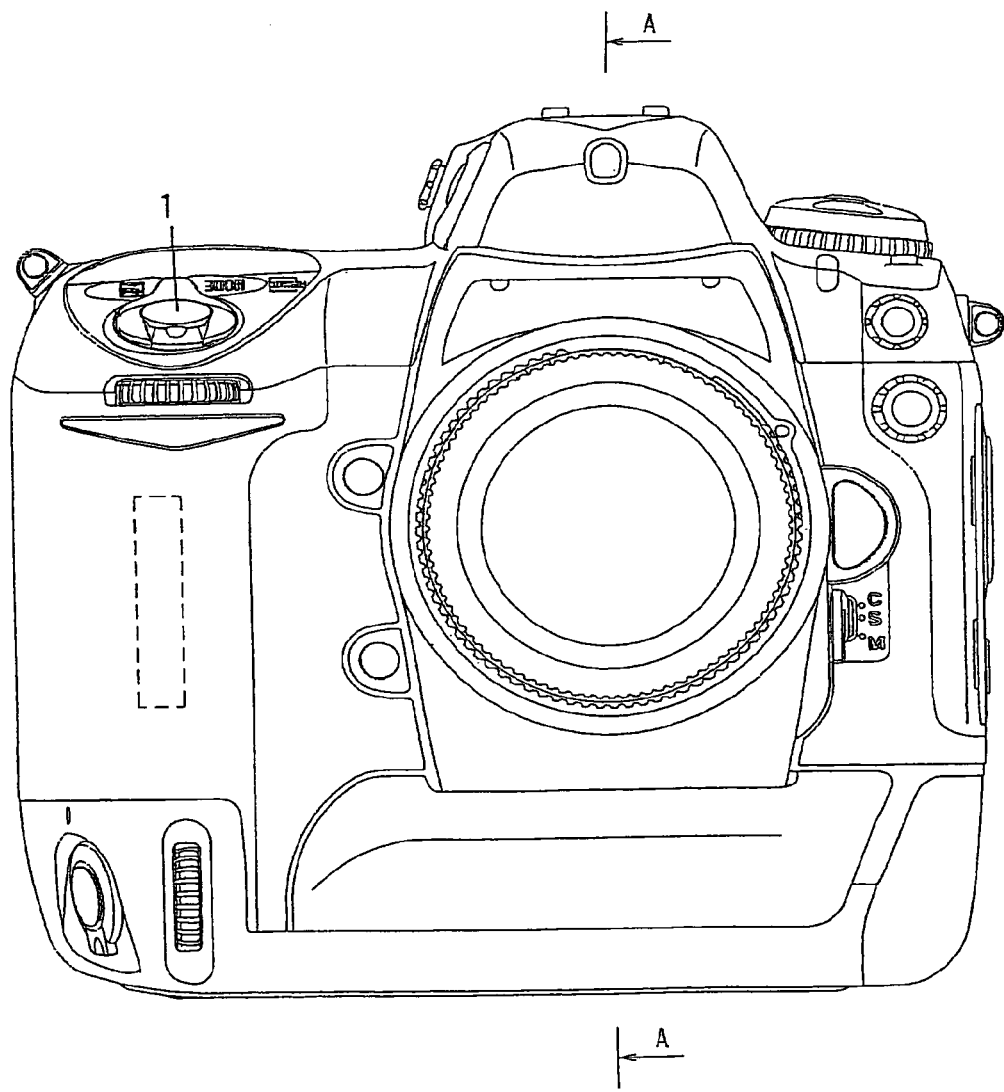
FIG. 1 is an elevational view showing a single-lens reflex digital camera according to an embodiment of the present invention.
Figure 2:
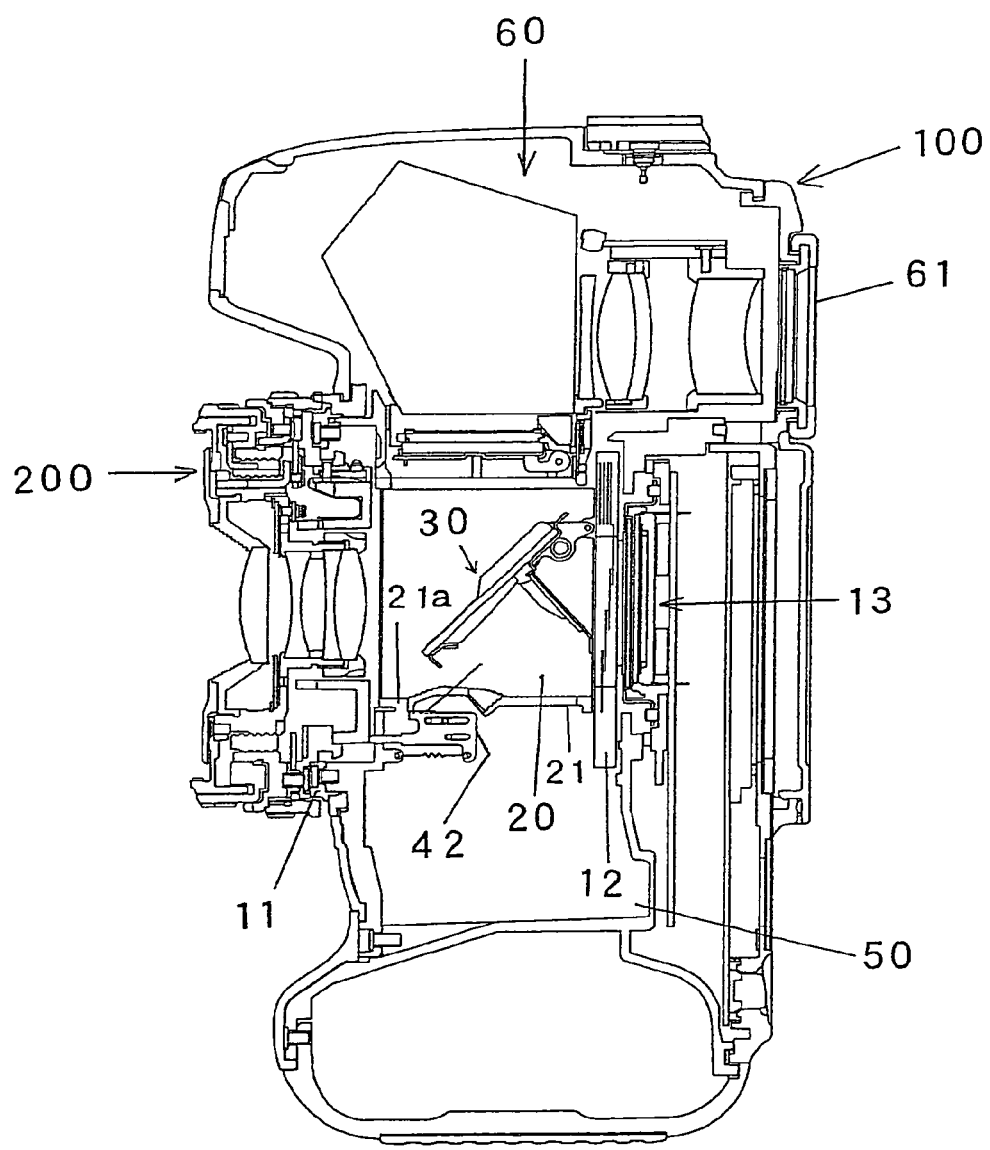
FIG. 2 is a cross-sectional view along the A-A line in FIG. 1.

FIG. 1 is an elevational view showing a single-lens reflex digital camera according to an embodiment of the present invention and FIG. 2 is a cross-sectional view along the A-A line in FIG. 1. A camera body 100 includes a lens mount 11 and behind the lens mount 11 a mirror box 20 that provides a photographic light path. Behind the mirror box 20 is arranged a shutter 12, and behind the shutter 12 is provided an imaging unit 13. Above the mirror box 20 is arranged a finder optical system 60.

On the lens mount 11 an interchangeable lens (photographic lens) 200 is to be mounted. A light flux from a photographic subject that passes through the interchangeable lens 200 is incident into the mirror box 20 through an opening of the lens mount 11. In the mirror box 20, there is arranged a mirror unit 30.

Figure 15:
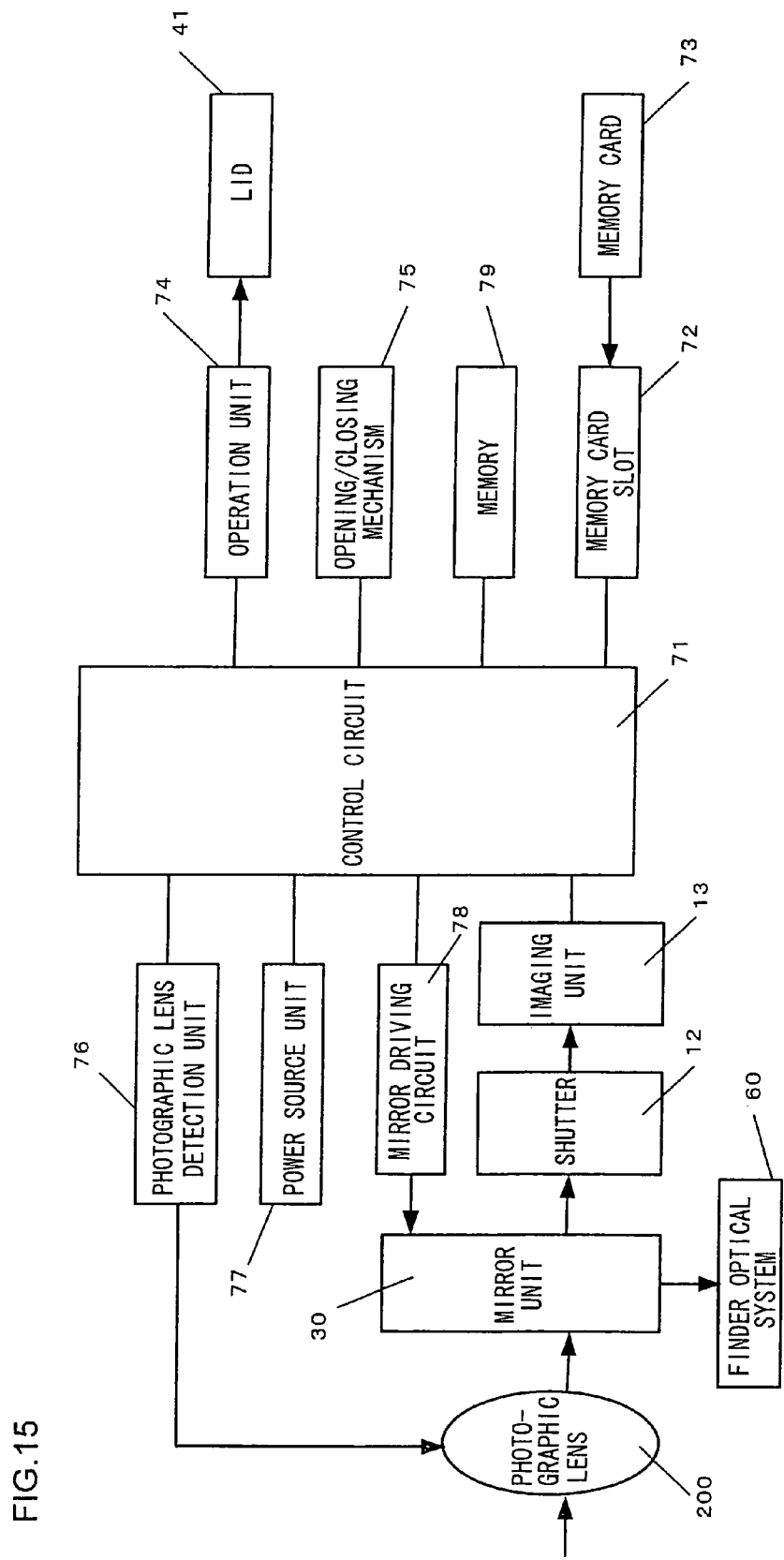
FIG. 15 is a block diagram illustrating control of the camera.

FIG. 15 is a schematic block diagram illustrating the construction of the digital camera of the present embodiment.

The light flux from the photographic subject input through the photographic lens 200, when the mirror unit 30 is in a viewing position as detailed hereinbelow, is reflected by the mirror unit 30 and incident into the finder optical system 60. On the other hand, when the mirror unit 30 is in a photographic position, the light flux is incident into the imaging unit 13, so that an image of the photographic subject is captured. The image unit 13 outputs an image signal, which is temporarily stored in a buffer memory not shown. Then, the image signal is sent to a control circuit 71, in which the image signal is subjected to well-known image processing such as white balance processing, color conversion processing or gradation correction processing. The image data obtained by the processing in the control circuit 71 is compressed by a well-known method such as a JPEG method and the compressed image data is recorded in a memory card 73 loaded in a memory card slot 72. The memory card 73 is detachably attached to the camera body 100. Note that the destination of recording of the image data may be the memory card 73 that is detachably attached to the camera body 100 or a memory 79 incorporated in the camera body 100.

An operation unit 74 includes various operation members to be operated by a user in order to operate the digital camera. The operation unit 74 includes, for example, a release button 1 and an operation member that instructs a dust removing operation detailed hereinbelow. A lid member 41 is a lid that opens and closes an air hole detailed hereinbelow. Opening and closing of the lid member 41 is controlled by the control circuit 71 through an opening/closing mechanism 75. Note that the opening/closing of the lid member 41 may be controlled not only by the control circuit 71 but also by a mechanical mechanism alone depending on whether or not the photographic lens 200 is loaded on the lens mount.

A photographic lens detection unit 76 detects whether the photographic lens 200 is attached to or detached from the camera body 100. A signal indicating whether the photographic lens 200 is attached to or detached from the camera body 100 detected by the photographic lens detection unit 76 may be sent to the control circuit 71 and a dust removal operation may be performed depending on whether the photographic lens 200 is attached or detached. Alternatively, a power source unit 77 may send a signal on ON/OFF of a power source to the control circuit 71 to make the dust removal operation be performed depending on ON/OFF of the power source of the digital camera. The mirror unit 30 is controlled by the control circuit 71 through a mirror drive circuit 78 and is driven not only when photographing but also when performing dust removal. The dust removal operation is detailed later on.

Figure 3:
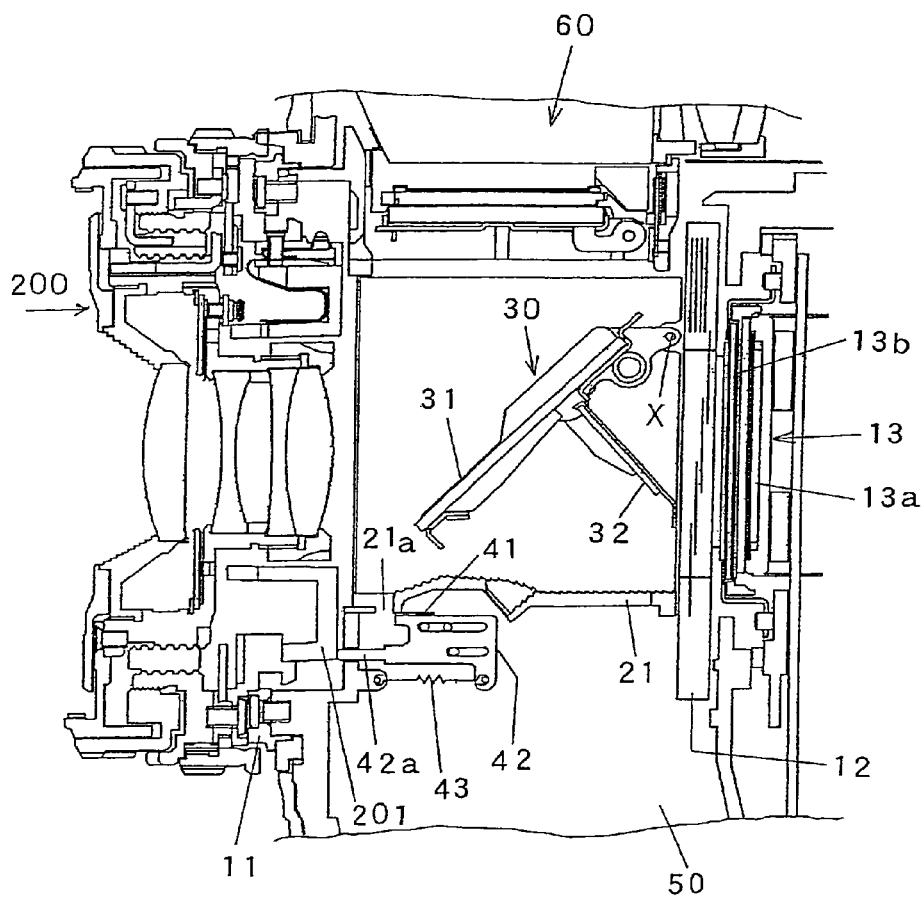
FIG. 3 is an enlarged view of the vicinity of a mirror box in FIG. 2.
Figure 4:
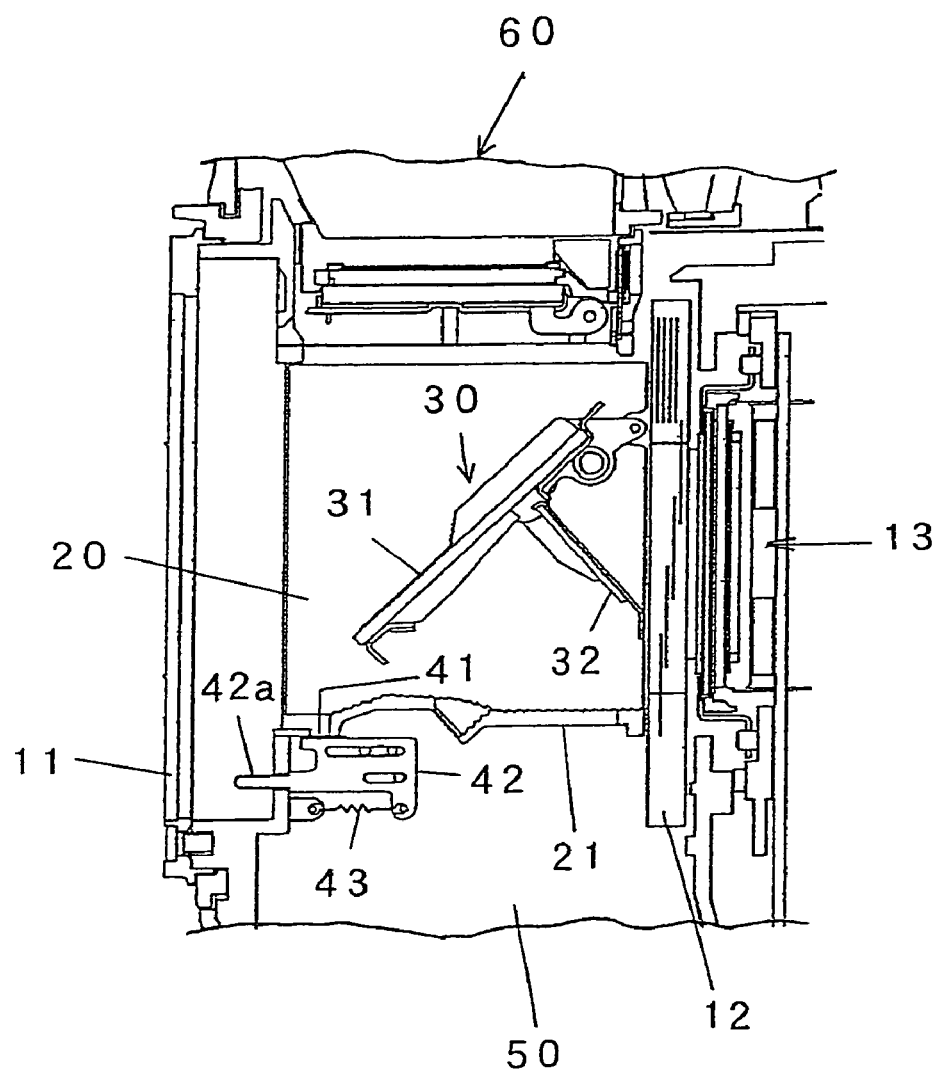
FIG. 4 is an enlarged view of the vicinity of the mirror box in a state in which an interchangeable lens is detached.
Figure 5:
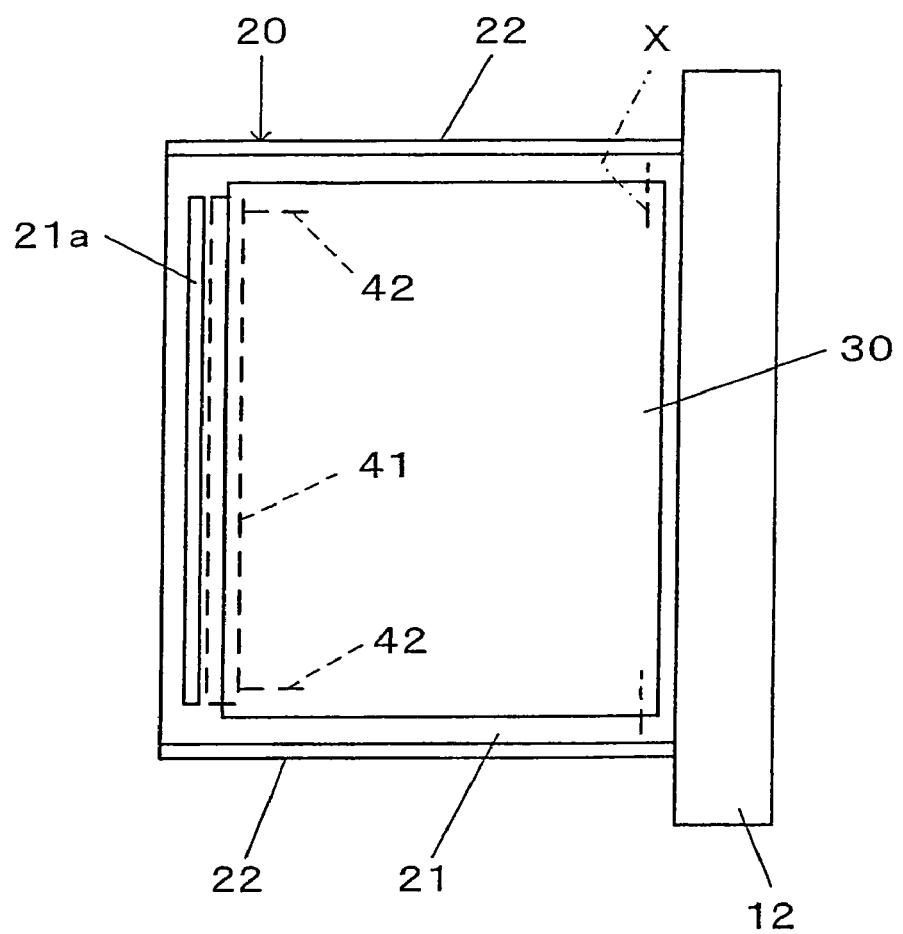
FIG. 5 is a schematic view of the mirror box as seen from above.

FIGS. 3 and 4 are enlarged views of the vicinity of the mirror box 20. FIG. 5 is a schematic view of the mirror box 20 as seen from above (from the side of a viewfinder). The mirror unit 30 includes a main mirror unit 31 which in turn includes a main mirror, which is a half mirror, and a support member therefor as well as a submirror unit 32 that includes a submirror and a support member therefor.

Figure 6:
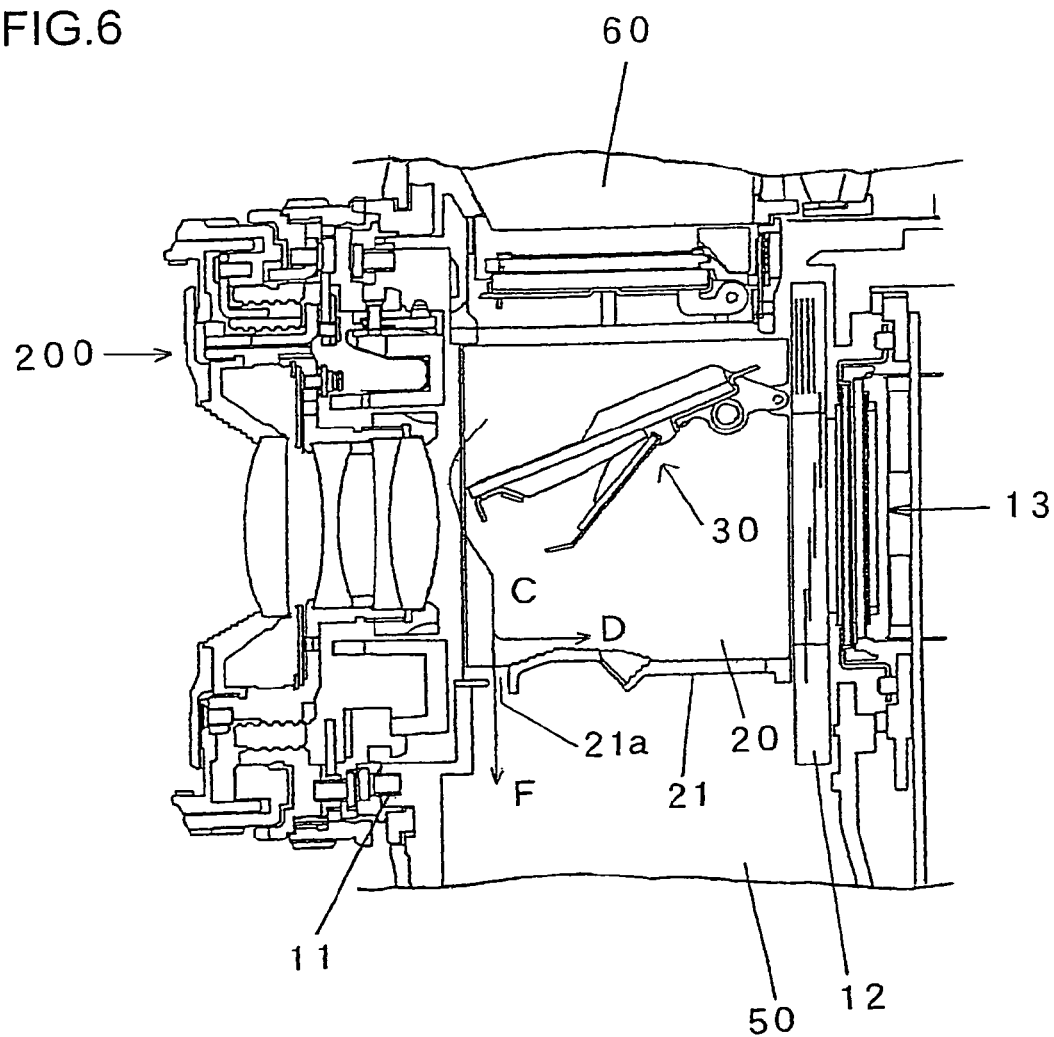
FIG. 6 is a view illustrating the flow of air while the mirror unit is being raised.
Figure 7:
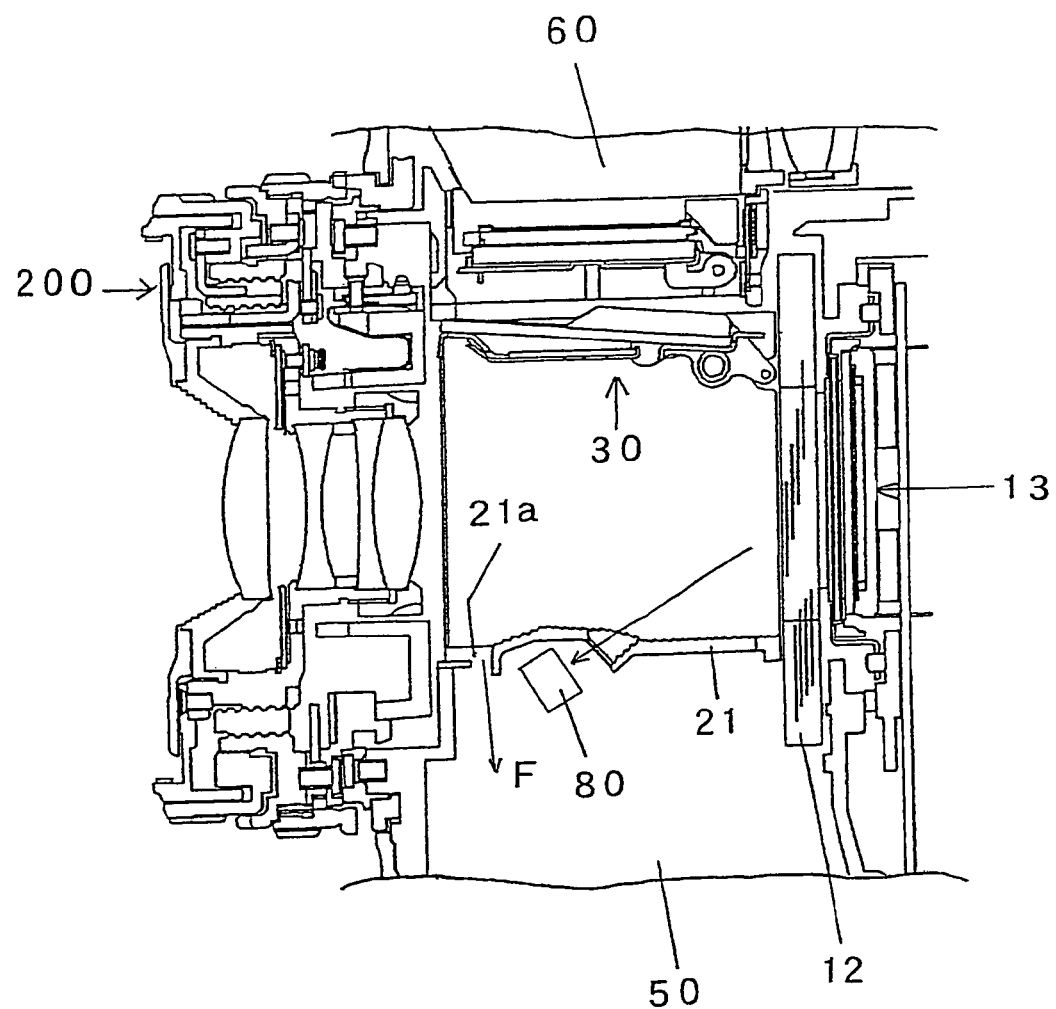
FIG. 7 is a view illustrating the mirror unit in a state in which it has been raised to a photographing position.

The main mirror unit 31 is rotatably supported on one end thereof around an X-axis along a lateral direction of the camera in a rear part of the mirror box 20 (see FIG. 3). The submirror unit 32 is supported on the main mirror unit 31 such that the submirror 32 is rotatable around the X-axis along the lateral direction of the camera. The mirror unit 30 is driven by the control circuit 71 through the mirror drive circuit 78 and is rotatable between a viewing position in which the mirror unit 30 is inserted in a photographing light path as shown in FIG. 3 and a photographic position in which the mirror unit 30 is retracted from the photographic light path as shown in FIG. 7. FIG. 6 shows a state in which the mirror is on the way of being rotated.

In a lower space 50 of the mirror box 20, there is provided a flash-sensor unit 80 (see FIG. 7). At the back of the flash-sensor unit 80 is arranged a focus detection unit (not shown) and in the front of the flash-sensor unit 80 is arranged a lens drive mechanism (not shown). The flash-sensor unit 80 includes an element that receives light reflected on a screen of the shutter 12 and performs photoelectric conversion of the received light to output a photoelectric conversion signal, which is utilized in flash control.

A bottom plate 21 of the mirror box 20 is bored to form a slit-like air hole 21a that communicates a space in the mirror box 20 with the lower space 50. The function and effect of the air hole 21a is detailed later on. The air hole 21a is provided closer to the photographic lens 200 than the flash-sensor unit 80 is (see FIG. 7), preferably closer to the photographic lens 200 than an edge of the mirror unit 30 on the side to the photographic lens 200 in the viewing position is (see FIG. 3). The width of the air hole 21a in the direction to front and rear of the camera is, for example, about 1 to about 2 mm in the present embodiment. However, the width may be smaller or larger than this.

The air hole 21a can be opened and closed by the lid member 41. The lid member 41 is supported on a base plate 42. The base plate 42 is supported so as to be movable in the direction to front and rear (in the direction of an optical axis of the photographic lens 200). A tension spring 43 urges the base plate 42 toward the photographic lens 200. In a slot provided in the base plate 42 is fitted a pin that protrudes from the camera body 100. The movement of the base plate 42 is guided with this construction. A protrusion 42a provided in the base plate 42 runs through the camera body 100 and abuts a rear wall 201 of the interchangeable lens 200 to be restricted of the movement of the base plate 42 as shown in FIG. 3. In this state, the lid member 41 is retracted at the back of the air hole 21a and the air hole 21a is open.

On the other hand, as shown in FIG. 4, when the interchangeable lens 200 is detached from the mount 11, the pressing force on the protrusion 42a is released. On this occasion, the base plate 42 is moved toward the lens mount 11 by the force urged thereon by the spring 43, and interlocked with the movement of the base plate 42, the air hole 21a is closed by the lid member 41.

Note that in FIGS. 6 and 7, the lid member 41 and its drive mechanism (the base plate 42 and the tension spring 43) are not shown. Further, it would be also acceptable to configure the digital camera such that the air hole 21a is opened due to retraction of the lid member 41 by the opening/closing mechanism 75 controlled by the control circuit 71 (see FIG. 15) while the mirror unit 30 is being rotated and when the mirror unit 30 is not being rotated, the air hole 21a is closed by the lid member 41. Also, it would be acceptable to configure the digital camera such that when the power of the digital camera is turned ON, the opening/closing mechanism 75 controlled by the control circuit 71 (see FIG. 15) causes the lid member 41 to be retracted to open the air hole 21a whereas when the power of the digital camera is turned OFF, the opening/closing mechanism 75 causes the lid member 41 to close the air hole 21a.

The imaging unit 13 is an integral structure of an image sensor 13a such as a CCD and an optical filter (such as an optical low pass filter or an infrared cut filter) 13b. Light flux that has passed through the opening of the shutter 12 transmits the optical filter 13b and is received by the image sensor 13a. The imaging sensor 13a converts the received light to a photoelectrically converted output, from which an image data is generated and stored.

In the digital camera thus constructed, when photography is not performed, the mirror unit 30 is in the viewing position shown in FIG. 3 and is inserted in the photographic light path. For this reason, part of the light flux from the photographic subject that is incident into the mirror box 20 is reflected upward by the main mirror unit 31 and enters the finder optical system 60 and viewed by the user through an eyepiece unit 61 (FIG. 2). Part of the light flux that has transmitted through the main mirror unit 31 is reflected downward by the submirror unit 32 and enters a focus detection unit (not shown) provided in the lower space 50 to contribute to focus detection.

When the release button 1 (see FIG. 1) is pressed all the way down, the control circuit 71 controls to flip up the mirror unit 30 to the photographing position as shown in FIG. 7 and to retract it from the photographic light path through the mirror drive circuit 75. Then, the shutter 12 is opened and the light flux incident into the mirror box 20 passes through the opening of the shutter 12 without being interrupted by the mirror unit 30 and is guided to the imaging unit 13.

When neither the photographic lens 200 nor a cap is mounted on the lens mount 11, the mirror box 20 communicates with an external space through the lens mount 11 and hence minute dust floating in the atmosphere could come into the mirror box 20 from the lens mount 11. Further, the dust generated in the camera, for example, when the shutter 12 or the like is driven floats in the mirror box 20. When the dust in the mirror box 20 adheres to the imaging unit 13, in particular the front of the optical filter 13b, the dust may appear on the photographed image to decrease the visual quality of the image.

Explanation is made on the mechanism in which dust adheres to the optical filter 13a.

Figure 8:
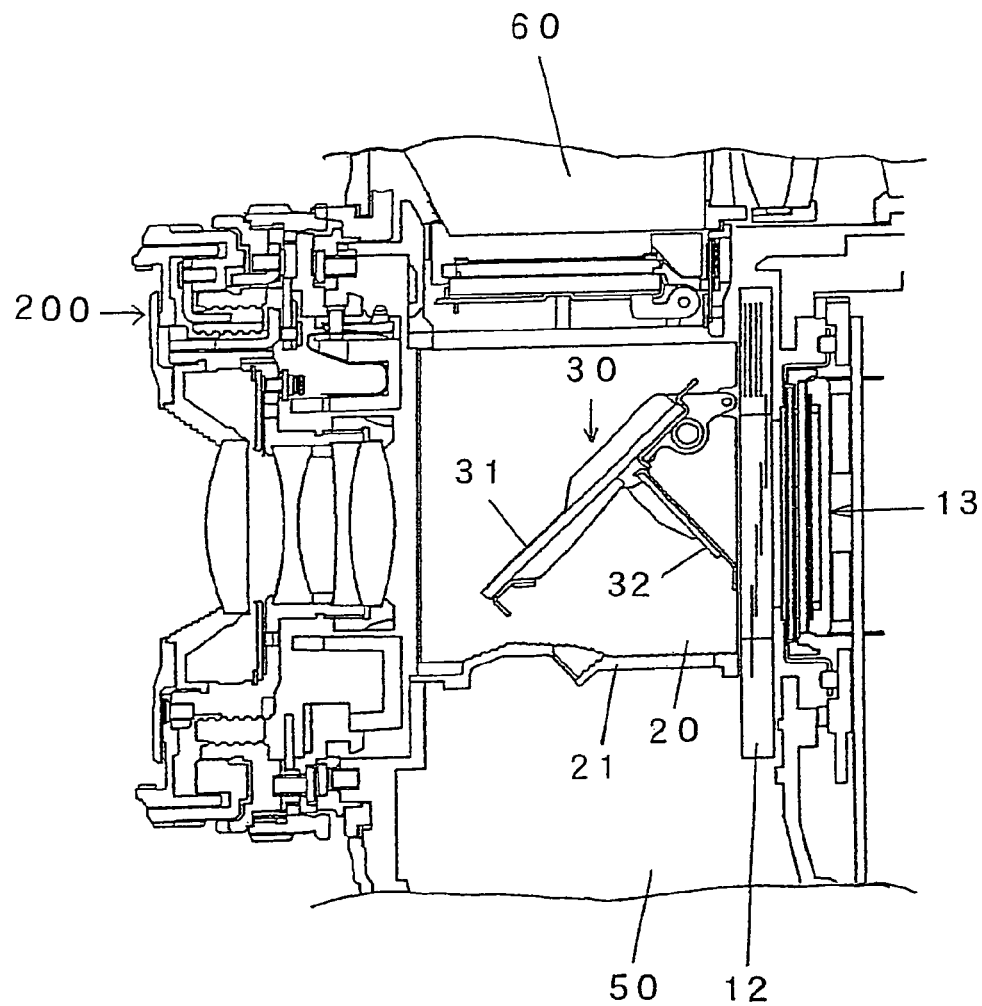
FIG. 8 is a view of a conventional camera illustrating the flow of air when the mirror unit is in a viewing position.
Figure 9:
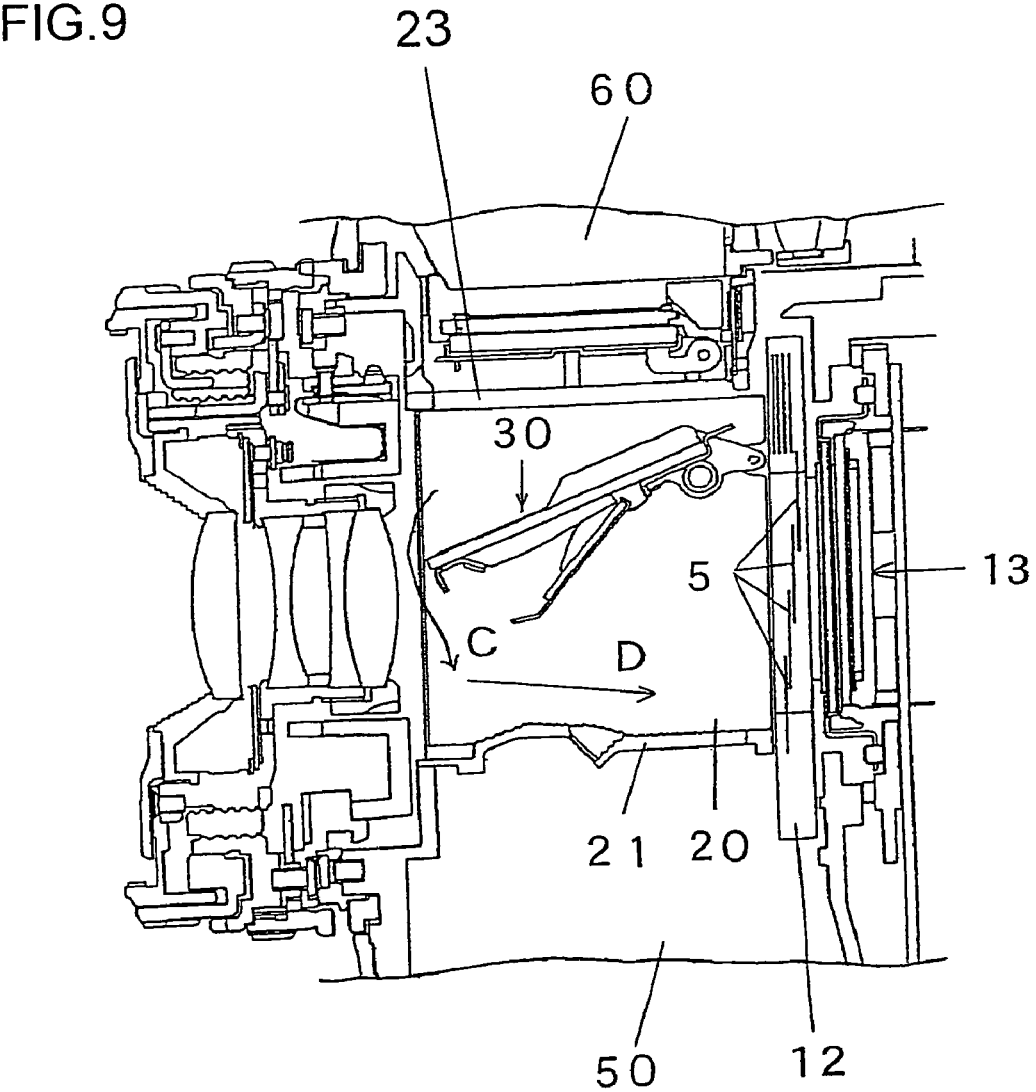
FIG. 9 is a view similar to FIG. 8, illustrating the state in which the mirror unit is being raised.
Figure 10:
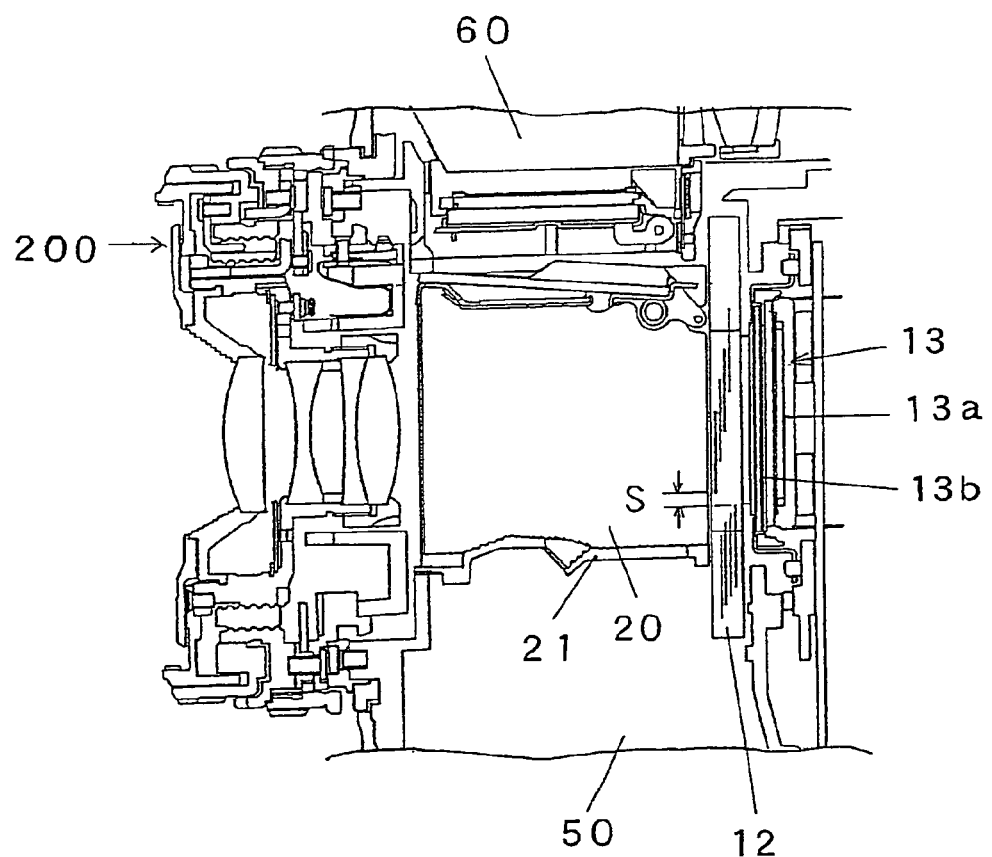
FIG. 10 is a view similar to FIG. 8, illustrating the state in which the mirror unit is in the photographing position.

FIGS. 8 to 10 show an example of a conventional camera that is provided with no air hole 21a. In FIGS. 8 to 10, parts that have similar functions as those in the present embodiment described above are assigned the same reference numerals.

When the mirror unit 30 is in the viewing position as shown FIG. 8, the space in the mirror box 20 is air-tightly closed by the interchangeable lens 200 and the shutter 12 in the direction to front and rear, by the finder optical system 60 and the bottom plate 21 (see FIG. 11B) in the direction of top and bottom, and by the side walls 22 in the direction of right and left. However, the space in the mirror box 20 is not completely closed. Since the mirror unit 30 is flipped up as shown in FIG. 9 when the release button is pressed, an upper space above the mirror unit 30 is abruptly narrowed, most of the air in the upper space flows down as a relatively rapid stream in the front of the mirror unit 30, that is, a space between the mirror unit 30 and the interchangeable lens 200 (arrow C). On this occasion, the dust in the air moves to the same direction (direction indicated by the arrow C) as entrained in the flow of air.

The air that has flown down collides with the bottom plate 21 of the mirror box 20 to be turned to a different direction to form a flow of air toward the side of the shutter 12 (arrow D). Thereafter, as shown in FIG. 10, the mirror unit 30 reaches the photographing position and when the shutter 12 is opened, the air directed toward the side of the shutter 12 passes through an opening S of the shutter 12 (slit opening) to reach the imaging unit 13. The dust carried by the air adheres to the front surface of the optical filter 13b.

Next, explanation is made on dust controlling effect provided by the air hole 21a.

In the present embodiment, the bottom plate 21 of the mirror box 20 is provided with the air hole 21a on its part in the front of the mirror unit 30 (on the side of the photographic lens 200) and when the interchangeable lens is mounted, the air hole 21a is opened. The position of the air hole 21a is just below the flow of the air that flows down due to the flipping of the mirror unit 30 as shown in FIG. 6, so that most of the air that flows down passes through the air hole 21a and goes straight forward (arrow F) to be discharged into the lower space 50. As a result, most of the dust entrained in the air is also discharged in the lower space 50. Therefore, the amount of the air (dust) that goes in the direction of D on the bottom plate 21 of the mirror box 20 is much more decreased than conventionally and the amount of the dust that adheres on the optical filter 13b after the shutter 12 is opened as shown in FIG. 7 is decreased.

In order to discharge the dust to the outside of the mirror box 20 by utilizing the flow of air generated by the mirror unit 30 to decrease the flow of the air toward the direction D in FIG. 9, the position of the air hole 21a to be formed may be determined as follows.

The air hole 21a is formed only in an area of the bottom plate 21 that is closer to the photographic lens 200 than the edge of the mirror unit 30 on the side of the photographic lens 200.

The air hole 21a may be provided such that at least a part of the air hole 21a is arranged in an area of the bottom plate 21 that is closer to the photographic lens 200 than the edge of the mirror unit 30 on the side of the photographic lens 200.

The air hole 21a may be provided in an area in the direction of rotation of the mirror unit 30 (in the direction of C or in a reverse direction thereto in FIG. 9) of the bottom plate 21 or of a top plate of the mirror box 20.

The position of the air hole 21a in the bottom plate 21 in a direction perpendicular to an optical axis of the photographic lens 200 is preferably in a central part near the optical axis of the photographic lens 200. Although the length of the air hole 21a to its long side (in the longitudinal direction in FIG. 5) is preferably the same as or smaller than the width of the mirror unit 30, it may be larger than the width of the mirror unit 30.

The air hole 21a may be provided in an area closer to the photographic lens 200 than the intersection of the mirror unit 30 in the viewing position and the optical axis of the photographic lens 200.

In this manner, in the present embodiment, by a simple operation such that a part of the mirror box 20 is provided with the air hole 21a without addition of any members, the amount of dust that adheres to the imaging unit 13 can be decreased. The inventors of the present embodiment have conducted experimentation comparing the state in which dust adheres to the optical filter 13b between the structure of the present embodiment and the conventional structure shown in FIGS. 8 to 10. The results confirm that the amount of adherent dust after repeating the photographing operation with the camera body 100 10,000 times can be reduced according to the structure of the present embodiment to about half that of the conventional structure.

When the interchangeable lens 200 is detached from the lens mount 11, the part where the air hole 21a is provided is exposed to the outside. On this occasion, since the air hole 21a is closed by the lid member 41, the members arranged in the lower space 50 are not viewed, so that the appearance of the camera is not deteriorated.

As mentioned above, the operation of discharging dust accompanying driving of the mirror upon photographing has been explained. Next, the operation of discharging dust in time other than photographing is explained.

For example, upon interchanging lenses, there is a possibility that dust outside comes into the inside of the mirror box 20. After the interchange of the lenses, the control circuit 71 detects that the interchangeable lens 200 is attached and controls to flip the mirror unit 30 from the viewing position to the photographing position and then to return it to the viewing position. The driving of the mirror is performed in a state in which the shutter 12 is closed. This enables much of the dust that has come into the mirror box 20 to be discharged to the lower space 50 through the air hole 21a. Thereafter, the dust is discharged also by driving of the mirror upon photographing, so that the amount of the dust that is adherent to the optical filter 13 can be further decreased.

Also, the driving of the mirror may be performed in the same manner as that at the time of interchanging lenses in order to discharge dust in other opportunities than when the lenses are interchanged, for example, when the power to the digital camera is turned ON or OFF. Alternatively, the driving of the mirror may be performed similarly in order to discharge dust in accordance with a specified operation, that is, dust discharge operation, by the user. In both cases, it is preferred that the driving of the mirror is permitted only in a state in which the incoming of dust from outside is blocked, that is, only when the interchangeable lens 200 or the cap is attached to the lens mount 11. Further, the driving of the mirror in the timing other than the photographing is effective even when performed only once but repeating it in a plurality of times enables more dust to be discharged.

Further, the driving of the mirror may be performed in order to remove the dust that has adhered to the optical filter 13b. The driving of the mirror to remove this dust is performed in a state in which the shutter 12 is open. In contrast to the above-mentioned dust discharge action, when the mirror unit 30 is flipped down from the photographing position to the viewing position, the air below the mirror unit 30 flows through the shutter opening against the front surface of the optical filter 13b to blow off the dust thereon. Since the space below the mirror unit 30 is abruptly narrowed according to the flip down of the mirror unit 30, most of the air below the lower space flows in the lower space below the mirror unit 30 in the direction of front and moves to the space in front of the mirror unit 30. This flow causes the dust to move to the space in front of the mirror unit 30 and the dust is discharged to the lower space 50 through the air hole 21a by the next and subsequent actions of the mirror unit 30.

Also, it would be acceptable that the mirror unit 30 is rotated from the photographing position to the viewing position in a state in which the shutter 12 is open, and the mirror unit 30 is rotated from the viewing position to the photographing position in as state in which the shutter 12 is closed. When the mirror unit 30 is rotated from the photographing position to the viewing position, the shutter 12 is open, so that the air below the mirror unit 30 flows through the opening of the shutter 12 against the front surface of the optical filter 13b to blow off the dust thereon. Next, when the mirror unit 30 is rotated from the viewing position to the photographing position, the shutter is in a closed state, and the dust in the mirror box 20 is discharged through the air hole 21a. This operation is performed at least once, preferably a plurality of times to enable the dust adherent to the optical filter 13b to be removed. The driving of the mirror in this case too is preferably permitted only when the interchangeable lens 200 or the cap is attached to the lens mount 11. This operation may be performed at the time of turning ON or OFF the power of the digital camera, or in response to a specified operation by the user. Further, the removal of the dust may be performed as follows. That is, the user judges whether or not dust is adherent to the optical filter 13b based on the photographed image and when it is judged that the dust is adherent, the driving of the mirror is performed in response to the dust discharge operation by the user to discharge the dust. In this case, in order to make it easy to judge whether or not dust is adherent, it would be acceptable to photograph a white object by the digital camera and judge whether or not dust is adherent based on the photographed image. Further, it would be acceptable to perform the judgment whether or not dust is adherent by the control circuit 71 and to automatically perform the driving of the mirror to remove the dust.

Further, the conventional method in which the imaging unit is vibrated to shake off dust and the above-mentioned dust discharge method according to the present embodiment may be used in combination. In this case, by performing the driving of the mirror for the removal of the dust while vibrating the imaging unit 13, the efficiency of dust removal is increased due to synergism between the vibration and the flow of air. Hereinafter, the operation in this case is explained.

First, in a state in which the shutter 12 is open, vibration of the optical filter 13b is started in order to remove the dust adherent to the optical filter 13b. Then, the mirror unit 30 is driven a plurality of times to discharge from the air hole 21c. When the driving of the mirror unit 30 is completed, the shutter 12 is closed and the vibration of the optical filter 13b is stopped. The adherent dust is removed by vibrating the optical filter 13b and the removed dust is discharged through the air hole 21c by driving the mirror unit 30. Also, by driving the mirror unit 30, the dust remaining on the surface of the optical filter 13b can be removed. Note that the direction of driving the mirror unit 30 is not particularly limited. It is preferred to arrange the mirror unit 30 in the photographing position and then perform an operation to drive it to the viewing position.

Note that it would also be acceptable to vibrate the optical filter 13b in a state in which the shutter 12 is open to remove the dust, and to close the shutter 12 before the mirror unit 30 is driven and to stop the vibration of the optical filter 13b. Also, the vibration of the optical filter 13b may be performed only for the first time. It is preferred that the dust removal operation is permitted only when the interchangeable lens 200 or the cap is attached to the lens mount 11.

Further, the dust detection may be performed as follows. That is, an illumination means (not shown) such as an LED is provided below the mirror box 20 and the imaging unit 13 is illuminated through an opening (not shown) in the lower surface of the mirror box 20 to detect dust adherent to the optical filter 13b. Then, based on the result of the dust detection, it is judged whether or not it is necessary to remove the dust, and when the result is affirmative, the driving of the mirror is performed in order to remove the dust.

Figure 11A:
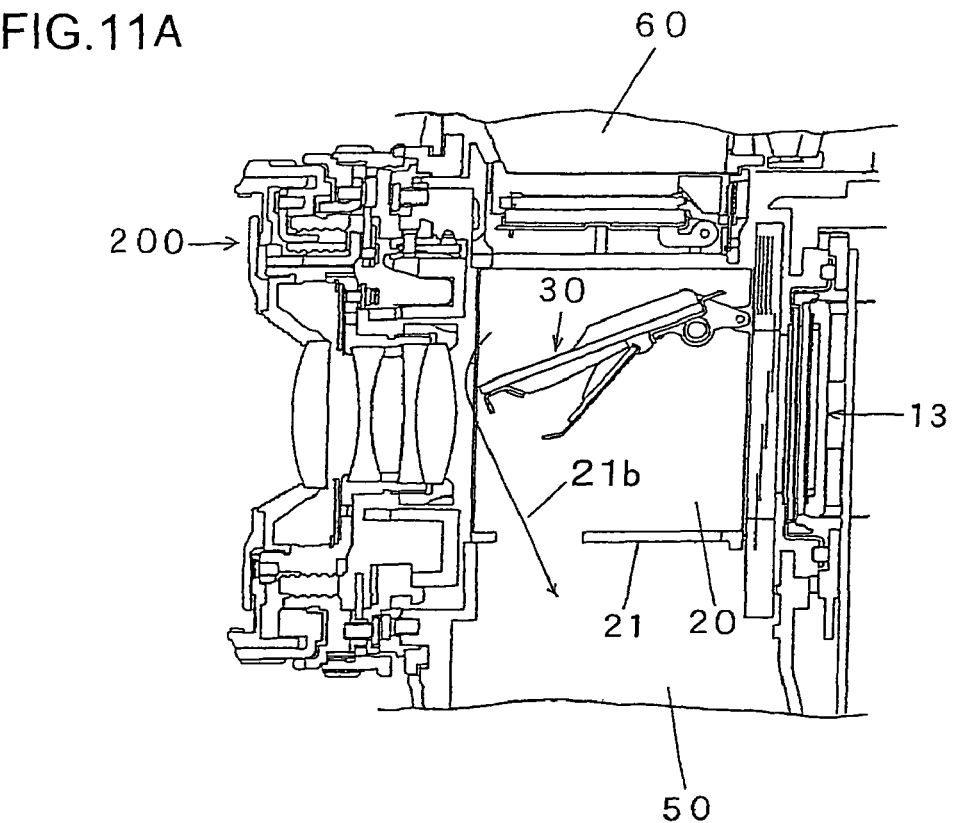
FIGS. 11A and 11B are each a view showing an example of the camera provided with a large air hole.
Figure 11B:
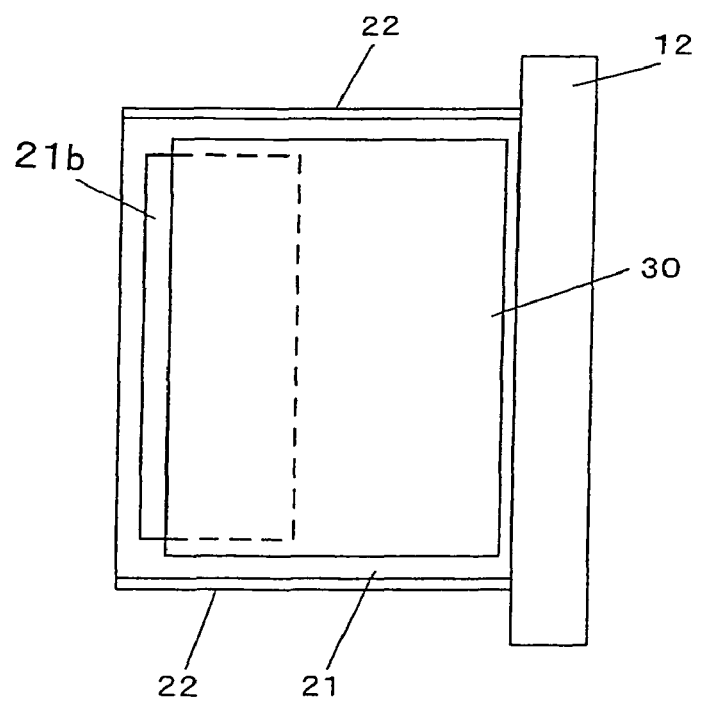

Note that the number and shape of the air holes 21a may be optional. In the above-mentioned embodiment, the air hole 21a is provided in a part of the bottom plate 21 that is closer to the photographic lens 200 than the edge of the mirror unit 30 on the side of the photographic lens 200. However, for example, as shown in FIGS. 11A and 11B, the air hole 21a may be provided as extending to the rearward of the edge of the mirror unit 30 on the side of the photographic lens 200.

Figure 12:
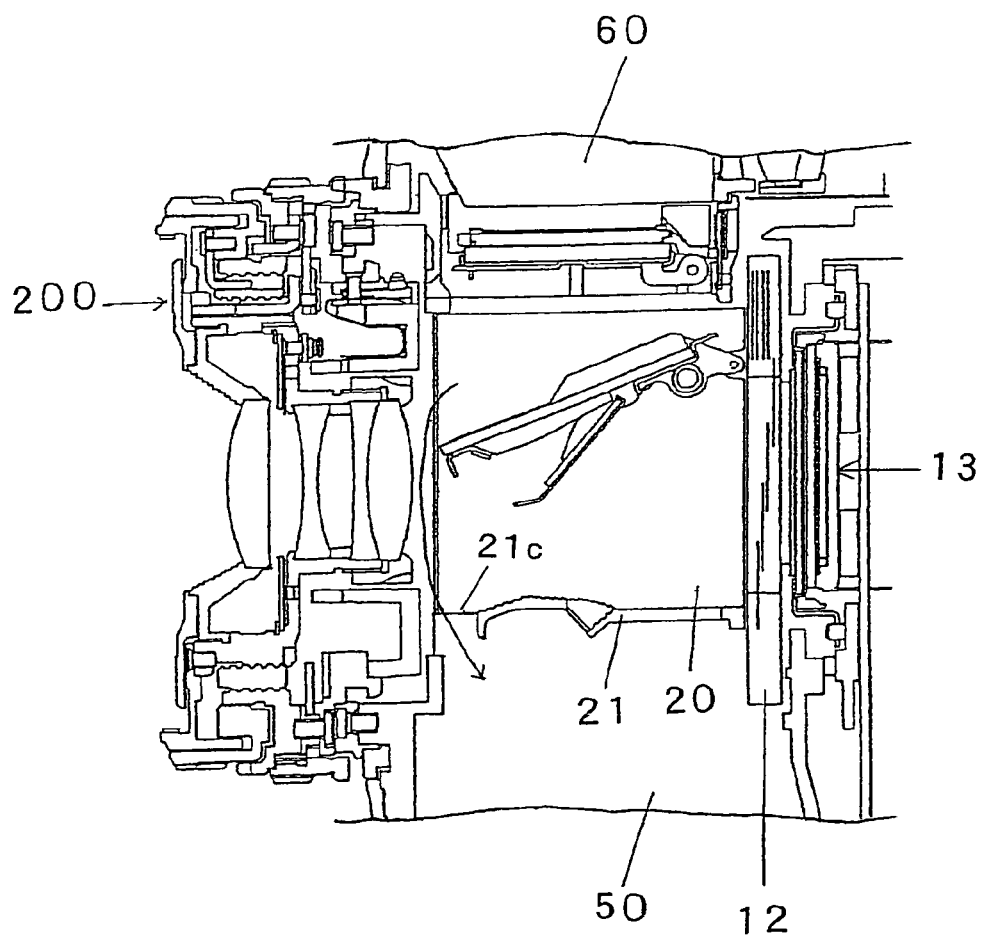
FIG. 12 is a view showing an example in which an air hole is provided at a corner portion defined by the bottom plate of the mirror box and a lens mount.

Further, as shown in FIG. 12, the air hole 21c may be extended on the side of the photographic lens 200.

Figure 13:
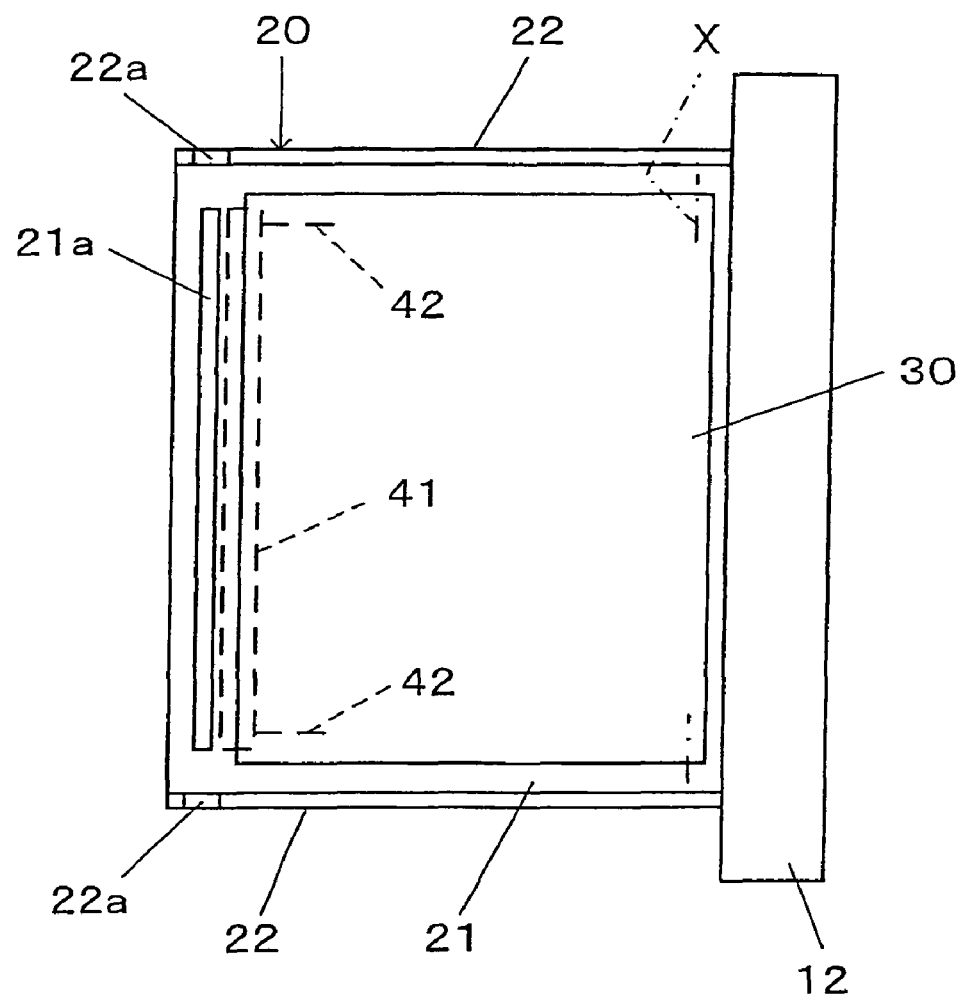
FIG. 13 is a view showing an example in which a side wall of the mirror box is provided with an air hole.

Further, it is expected that the air hole 21c provides the dust removal effect when it is provided in a surface other than the bottom plate 21 of the mirror box 20 as far as the condition is satisfied that the air hole 21c includes a part that is further closer to the photographic lens 200 than the edge of the mirror unit 30 in the viewing position on the side of the photographic lens 200. FIG. 13 shows an example in which in addition to the air hole 21a in the bottom plate 21 of the mirror box 20, the air holes 22a are provided on both side walls 22 of the mirror box 20, respectively. An air hole may be provided on an upper plate of the mirror box 20.

Figure 14:
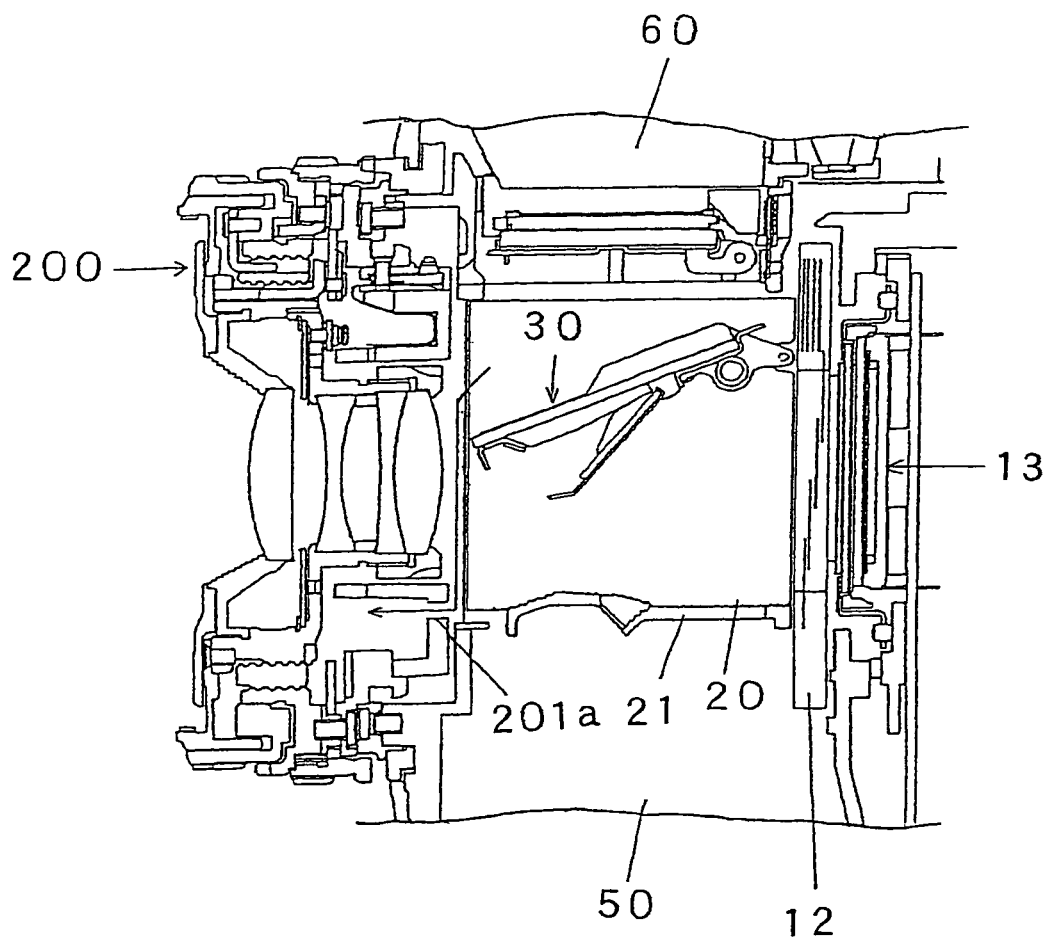
FIG. 14 is a view showing an example in which the interchangeable lens is provided with an air hole.

Further, instead of providing an air hole in the mirror box 20, an air hole 201a may be provided for example, in a rear wall surface 201 (a surface opposing the mirror unit 30; see FIG. 3) of the interchangeable lens 200, as shown in FIG. 14. In this case, by the flip up of the mirror unit 30, air containing dust in the mirror box 20 is discharged through the air hole 201a to a space in the interchangeable lens 200 to provide an effect similar to that mentioned above.

Further, in the above-mentioned embodiment, explanation has been made on the example in which the mirror unit 30 is rotated about the axis X in the lateral direction of the digital camera. However, the present invention may be applied to a camera in which the mirror unit 30 is rotated about an axis in the direction of front and rear of the camera.

Note that in the above-mentioned embodiment, the camera is constructed such that the lid member 41 is opened/closed as interlocked with attachment/detachment of the interchangeable lens 200. However, when the driving of the mirror at the time other than the time of photographing (discharge of the dust) does not have to be taken into consideration, it would also be acceptable to construct the digital camera such that accompanying the pressing of the release button 1 all the way down, the lid member 41 is moved to the opened position before the driving of the mirror unit 30 is started and after the mirror unit 30 has reached the photographing position, the lid member 41 moves to the closed position. This construction can be realized by constructing the lid member 41 as being of the electric motor-driven type. Further, since the interchange of lenses is usually performed when the power of the digital camera is turned OFF, it would be acceptable to move the lid member 41 to the opened position accompanying the turning ON of the power of the digital camera and to the closed position accompanying to the turning OFF of the power of the digital camera.

Note that the lid member 41 may be omitted.

As detailed above, according to one embodiment of the present invention, adherence of dust to the imaging unit 13 can be effectively suppressed.

The above-described embodiments are examples, and various modifications can be made without departing from the scope of the invention.

What is claimed is:

1. A digital camera comprising:
   a mirror box that defines a space in which a light flux from a photographic lens is guided to an imaging unit;
   a mirror unit that is arranged inside the mirror box and is configured to rotate between a viewing position in which the mirror unit is inserted in a photographic light path from the photographic lens to the imaging unit to reflect the light flux and a photographing position in which the mirror unit is retracted from the photographic light path; and
   an opening section that discharges from the mirror box air that is moved when the mirror unit is rotated, wherein at least a part of the opening section is provided in an area of the mirror box which is closer to the photographic lens than an edge of the mirror unit in the viewing position, with the edge of the mirror unit being on a side towards the photographic lens.

2. A digital camera according to claim 1, wherein the opening section is provided in the mirror box closer to the photographic lens than a point of intersection between the mirror unit in the viewing position and an optical axis of the photographic lens.

3. A digital camera according to claim 1, further comprising:
a flash-sensor unit arranged in a vicinity of the mirror box, wherein
the opening section is provided in an area of the mirror box closer to the photographic lens than the flash-sensor unit.

4. A digital camera according to claim 1, wherein the opening section is provided in an area of the mirror box in a direction in which the mirror unit moves from the photographing position to the viewing position.

5. A digital camera according to claim 4, wherein the opening section is provided in an area close to an optical axis of the photographic lens.

6. A digital camera according to claim 1, wherein the opening section is provided only in a part of the mirror box closer to the photographic lens than an edge, on a side to the photographic lens, of the mirror unit in the viewing position.

7. A digital camera according to claim 1, wherein the opening section is provided in a plane of the mirror box, which plane intersects neither an optical axis of the photographic lens nor an axis of rotation of the mirror unit.

8. A digital camera according to claim 1, wherein the opening section is provided in a plane of the mirror box, which plane is near the mirror unit in the photographing position.

9. A digital camera according to claim 1, wherein the opening section is provided in a plane of the mirror box, which is on a side of the mirror box opposite to a plane near the mirror unit in the photographing position.

10. A digital camera according to claim 1, wherein the opening section is provided in a plane of the mirror box, which plane intersects an axis of rotation of the mirror unit.

11. A digital camera according to claim 1, further comprising:
a shutter arranged between the mirror unit and the imaging unit, wherein
the mirror unit is rotated when the shutter is in a closed state.

12. A digital camera according to claim 1, further comprising:
a shutter arranged between the mirror unit and the imaging unit, wherein
the mirror unit is rotated from the photographing position to the viewing position when the shutter is in an opened state.

13. A digital camera according to claim 1, further comprising:
a shutter arranged between the mirror unit and the imaging unit, wherein
the mirror unit is rotated from the photographing position to the viewing position when the shutter is in an opened state, and
the mirror unit is rotated from the viewing position to the photographing position when the shutter is in a closed state.

14. A digital camera according to claim 1, further comprising:
a lid member that is adapted to open and close the opening section.

15. A digital camera, comprising:
a mirror box that defines a space in which a light flux from a photographic lens is guided to an imaging unit;
a mirror unit that is arranged inside the mirror box and is configured to rotate between a viewing position in which the mirror unit is inserted in a photographic light path from the photographic lens to the imaging unit to reflect the light flux and a photographing position in which the mirror unit is retracted from the photographic light path;
an opening section that discharges from the mirror box air that is moved when the mirror unit is rotated; and
a lid member that is adapted to open and close the opening section, wherein:
the photographic lens is detachably attached to a camera body of the digital camera, and
the lid member is adapted to be in an open state when the photographic lens is attached to the camera body of the digital camera and to be in a closed state when the photographic lens is detached from the camera body of the digital camera.

16. A digital camera comprising:
a mirror box that defines a space in which a light flux from a photographic lens is guided to an imaging unit;
a mirror unit that is arranged inside the mirror box and is configured to rotate between a viewing position in which the mirror unit is inserted in a photographic light path from the photographic lens to the imaging unit to reflect the light flux and a photographing position in which the mirror unit is retracted from the photographic light path;
an opening section that discharges from the mirror box air that is moved when the mirror unit is rotated; and
a lid member that is adapted to open and close the opening section,
wherein the lid member is adapted to be in an open state when the mirror unit is being rotated and to be in a closed state when the mirror unit is not being rotated.

17. A digital camera, comprising:
a mirror box that defines a space in which a light flux from a photographic lens is guided to an imaging unit;
a mirror unit that is arranged inside the mirror box and is configured to rotate between a viewing position in which the mirror unit is inserted in a photographic light path from the photographic lens to the imaging unit to reflect the light flux and a photographing position in which the mirror unit is retracted from the photographic light path;
an opening section that discharges from the mirror box air that is moved when the mirror unit is rotated; and
a lid member that is adapted to open and close the opening section,
wherein the lid member is adapted to be in an open state when power of the digital camera is ON and to be in a closed state when the power of the digital camera is OFF.

18. A digital camera according to claim 1, wherein the opening section is disposed at a bottom surface of the mirror box.

19. A digital camera according to claim 1, wherein the opening section is formed in a slit shape.

20. A digital camera according to claim 1, further comprising a lens mount on which the photographic lens is mountable.

* * * * *